(No Model.)
S. T. ESKEW.
HARROW, CULTIVATOR, &c.
No. 497,642. Patented May 16, 1893.
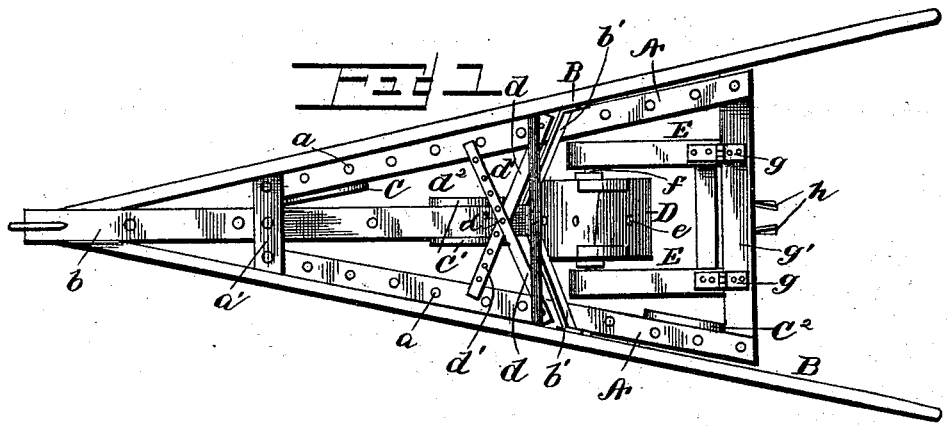
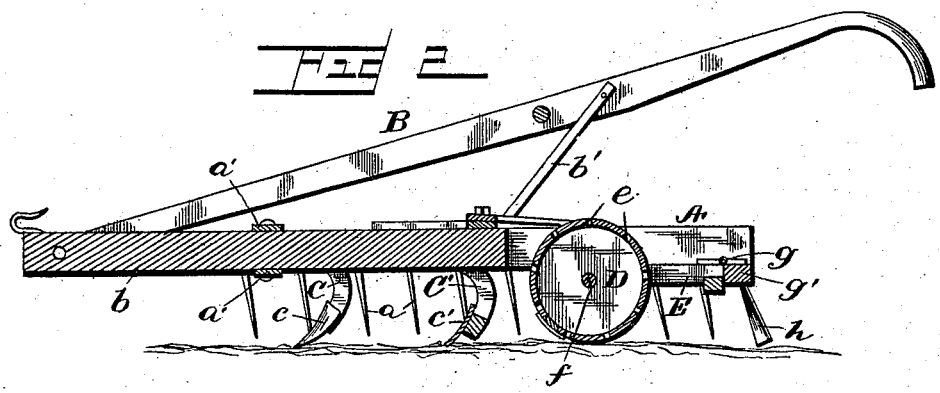
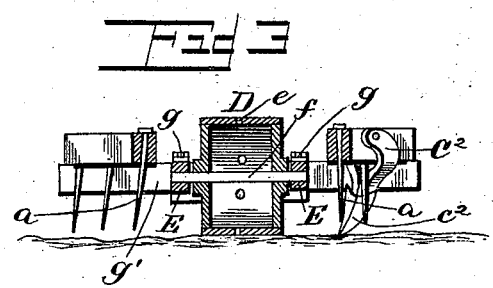
Witnesses
Inventor
Samuel T. Eskew
By his Attorneys

UNITED STATES PATENT OFFICE.

SAMUEL T. ESKEW, OF SUGAR VALLEY, GEORGIA.

HARROW, CULTIVATOR, &c.

SPECIFICATION forming part of Letters Patent No. 497,642, dated May 16, 1893.

Application filed January 20, 1892. Serial No. 418,622. (No model.)

*To all whom it may concern:*

Be it known that I, SAMUEL T. ESKEW, a citizen of the United States of America, residing at Sugar Valley, in the county of Gordon and State of Georgia, have invented certain new and useful Improvements in Harrows, Cultivators, and Seeding-Machines, of which the following is a specification, reference being had therein to the accompanying drawings.

My invention relates to an improved cultivator, seeder, roller and harrow, the object being to provide such an implement which may be used as a combined machine, or by certain manipulations be converted into a harrow or a cultivator, as desired.

The invention consists in the novel construction and combination of parts hereinafter fully described and claimed.

In the accompanying drawings, Figure 1 is a plan view of a combined cultivator, harrow and seeder constructed in accordance with my invention. Fig. 2 is a central longitudinal section of the same. Fig. 3 is a transverse section taken through the center of the cylindrical seed receptacle.

In the said drawings the reference letters A, A, designate two diagonal side or wing beams, removably connected at their forward ends with short transverse bars $a'$, $a'$, secured to a horizontal draft beam $b$. These wing beams are provided at their rear ends with a removable transverse bar $g'$. and are also provided with downwardly depending rake teeth $a$. Hinged at $g$, to the bar $g'$, are two forwardly projecting arms E, in the free ends of which is journaled a shaft $f$, carrying a cylindrical seed box D, provided with a series of circumferential seed openings or apertures $e$.

The letter B, designates two diagonal handles secured to the front end of the draft beam provided with brace bars $b'$, secured thereto and to the rear end of said brace beam.

Secured to the wing beams and also to the draft beam are curved cultivator standards C, C', C², arranged in different longitudinal planes, so that they will not follow in the track of each other. These standards are provided with cultivator shovels $c$, $c'$, $c^2$. To the rear cross bar $g'$ is secured a downwardly projecting hoe or seed coverer $h$.

Pivoted to the wing beams A, intermediate of the ends thereof, are two inwardly extending bars $d$, having a number of holes or apertures $d'$, near their free ends adapted to receive a bolt $d^2$.

As illustrated in the drawings the implement is employed as a combined cultivator, harrow, seeder and roller, and its operation will be readily understood. By throwing the seed box back by turning the arms E on their hinges, the machine is converted into a cultivator and harrow. By removing the rear cross bar $g'$, the wing beams can be turned on their pivots so that one of said beams will project outside of the handles, thus forming a side harrow and cultivator. By reversing the wing beams end to end, and connecting the rear cross bar $g'$, with the bars $a$, $a'$, a smoothing harrow is produced. The bars $d$, are for the purpose of retaining the wing beams in any position to which they may be laterally adjusted or spread apart.

Having thus described my invention, what I claim is—

The combination with the draft beam and the transverse bars secured thereto, of the removable wing beams pivoted to said bars, having downwardly projecting harrow teeth, the removable cross bar connecting the rear ends of said wing beams, the cultivator standards and shovels, the forwardly projecting arms hinged to said removable cross bar, the seed box having peripheral seed openings and its shaft journaled in said arms, and the pivoted bars connected with the wing beams and having a series of apertures near their free ends, substantially as described.

In testimony whereof I affix my signature in presence of two witnesses.

SAMUEL T. ESKEW.

Witnesses:
L. R. PITTS,
F. L. HICKS.